(No Model.)

J. K. PURINTON.
COOKING UTENSIL.

No. 573,291. Patented Dec. 15, 1896.

Witnesses:
R. G. Orwig
W. J. Sankey

Inventor: Judson K. Purinton,
By Thomas G. and J. Ralph Orwig,
Attorneys.

UNITED STATES PATENT OFFICE.

JUDSON K. PURINTON, OF DES MOINES, IOWA.

COOKING UTENSIL.

SPECIFICATION forming part of Letters Patent No. 573,291, dated December 15, 1896.

Application filed March 23, 1896. Serial No. 584,573. (No model.)

*To all whom it may concern:*

Be it known that I, JUDSON K. PURINTON, a citizen of the United States of America, residing at Des Moines, in the county of Polk and State of Iowa, have invented new and useful Improvements in Cooking Utensils, of which the following is a specification.

My object is to provide improved means for attaching sheet-asbestos or other suitable non-conducting covering to the exterior surfaces of roasting and basting ovens and frying-pans, &c., and for protecting the asbestos after it is in place, said means to be of simple construction, easily and quickly applied, and of great durability.

A further object is to provide a combined clamping device and handle for connecting the cover with the roasting or basting oven and providing a non-heat-conducting handle.

My invention consists in certain details in the construction of the pans and the arrangement and combination of the metal strip for holding the sheet-asbestos in place and protecting it from wear, and, further, in the construction of the handles and clamps, as hereinafter set forth, pointed out in my claims, and illustrated in the accompanying drawings, in which—

Figure 1:
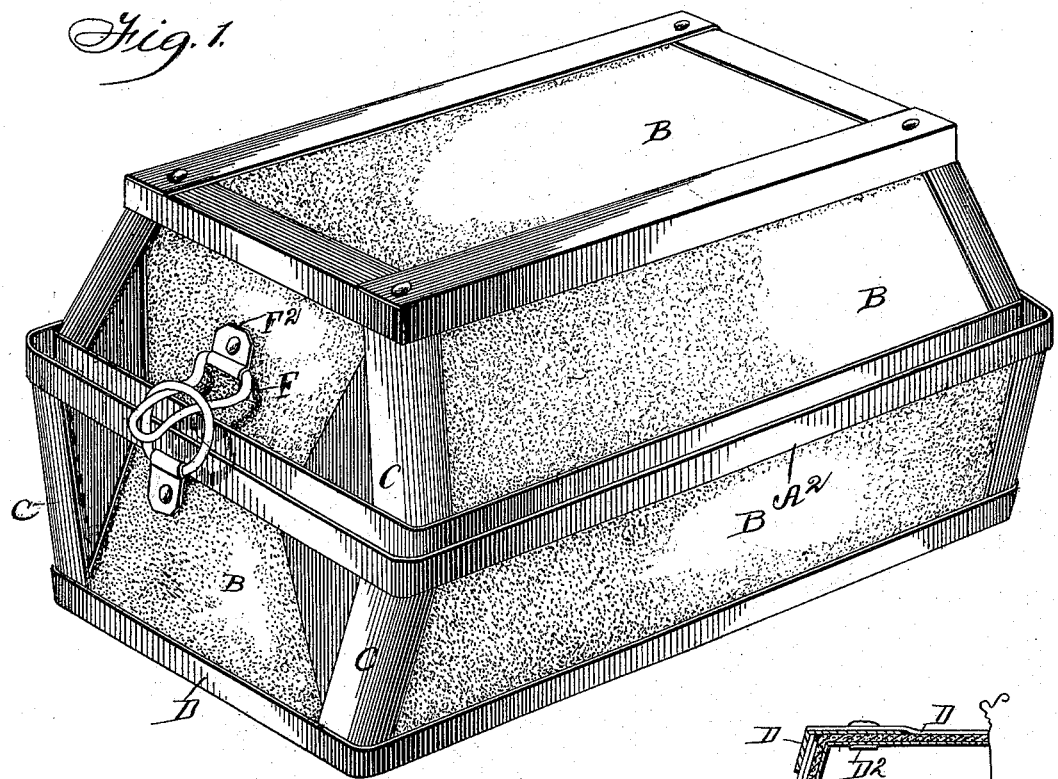
Figures 2, 3:
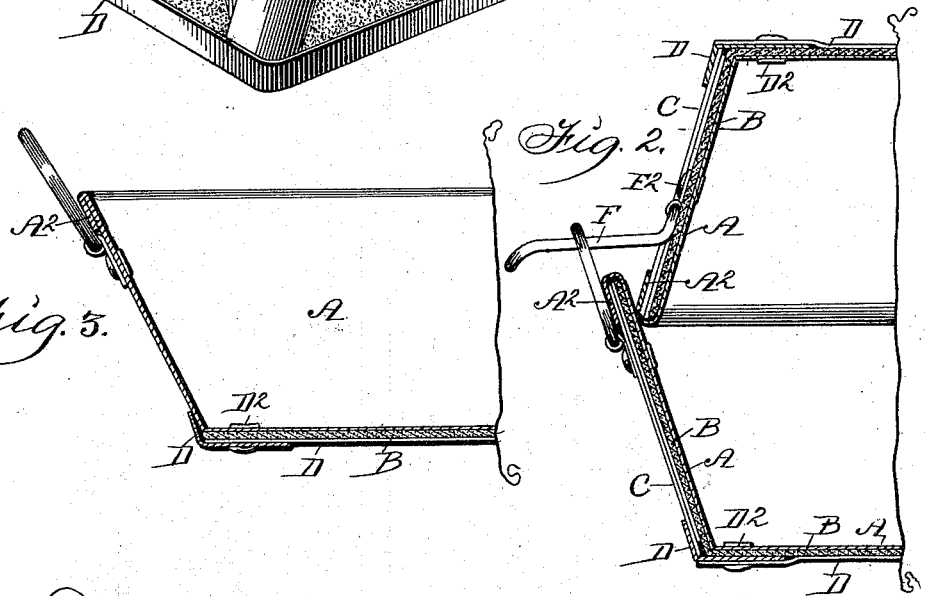

Figure 1 shows the complete roasting or basting oven in perspective. Fig. 2 shows a longitudinal section of the same, and Fig. 3 shows a frying-pan in longitudinal section.

Referring to the accompanying drawings, the reference-letter A is used to indicate a pan of the usual conformation made of a single piece of sheet metal with its edges bent outwardly and downwardly at $A^2$.

Sheets B, of asbestos or other incombustible material, are then placed over the outer surface of the pan and secured thereto and protected from wear as follows:

C indicates sheet-metal strips bent to a right angle and placed over the corner of the pan with their upper ends introduced between edges $A^2$ and the body of the pan and their lower ends bent parallel with the bottom of the pan. Around the bottom corners of the pan the metal strips D, bent to a right angle in cross-section, are passed, and they are secured in place by means of four rivets $D^2$, passed through the corners of the pan, the lower ends of the corner-pieces and said bottom pieces thus firmly clamping all of said parts together and providing protection for all of the edges of the pan by the use of a smaller number of rivets than by any other process.

In the frying-pan shown in Fig. 3 the sheet-asbestos is not applied to the sides of the pan, and hence the corner-pieces are omitted; otherwise the construction is identical.

It is usual to provide ovens and pans of this class with metal rings at their ends to serve as handles. I have provided similar rings for the lower section of the ovens so arranged that they cannot become heated through contact with the metal of the oven, and also a combined clamp and handle for connecting the two parts of the oven and also serving as a handle. These clamps and handles are each composed of an elongated wire loop F, attached to the pan by means of the metal loop $F^2$, which is held thereto in the outer surface of the pan and asbestos by means of a rivet $F^3$. The said loop F is bent first downwardly and then horizontally outward with its end curved downward. It is so positioned relative to the rings on the under pan that said rings may be made to overlap the loops when the cover is placed on the pan. Then when it is desired to raise the entire oven the said loops are grasped, and it is of course impossible for the two parts to separate so long as the said loops are held. It is obvious also that the heat of the oven cannot be communicated to the handles, because they engage only the asbestos covering.

Having thus described my invention, what I claim as new therein, and desire to secure by Letters Patent of the United States therefor, is—

1. The combination with a roasting or basting oven having a pan and a cover therefor, of a device at each end comprising a metal ring pivoted to the end of the pan and capable of swinging upwardly to overlap the lower end of the cover, and an elongated metal loop pivoted to the cover and then bent downwardly and finally outwardly from the pan, as required to restrict its downward movement and yet permit it to fold upwardly, said parts being so arranged that they may both fold close to the parts to which they are pivoted and so that the ring may be made to overlap the elongated loop and thus secure the pan and cover together and also hold the loop in a horizontal position or against folding upwardly so that it may be used as a handle substantially as set forth.

2. A sheet-metal cooking utensil having its edges bent to overlap its outer side, asbestos in sheet form placed on its sides and bottom, the upper edges of the asbestos which is disposed upon the sides extending beneath said overlapping edges, corner-pieces, L-shaped in cross-section, to pass under said overlapping edges and beneath the bottom, metal strips L-shaped in cross-section passed around the lower corners and rivets passed through the bottom of the pan and said corner-pieces and bottom strips, substantially as and for the purposes stated.

JUDSON K. PURINTON.

Witnesses:
JAMES RICHARDS,
THOMAS G. ORWIG.